US010915562B2

(12) United States Patent
Erpenbach et al.

(10) Patent No.: US 10,915,562 B2
(45) Date of Patent: Feb. 9, 2021

(54) NATURAL LANGUAGE PROCESSING REVIEW AND OVERRIDE BASED ON COGNITIVE SYSTEM ANALYSIS

(71) Applicant: International Business Machines Corporation, Armonk, NY (US)

(72) Inventors: Eric L. Erpenbach, Rochester, MN (US); Andrew J. Lavery, Austin, TX (US); Richard J. Stevens, Monkton, VT (US); Fernando J. Suarez Saiz, Armonk, NY (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 15/408,535

(22) Filed: Jan. 18, 2017

(65) Prior Publication Data
US 2018/0203922 A1   Jul. 19, 2018

(51) Int. Cl.
*G06F 16/33* (2019.01)
*G06F 40/30* (2020.01)

(52) U.S. Cl.
CPC .......... *G06F 16/3334* (2019.01); *G06F 40/30* (2020.01)

(58) Field of Classification Search
CPC ........... G06F 17/30663; G06F 17/2785; G06F 16/3334; G06F 40/30
See application file for complete search history.

(56) References Cited

U.S. PATENT DOCUMENTS

| | | | |
|---|---|---|---|
| 2008/0046405 A1* | 2/2008 | Olds | G06F 17/3064 |
| 2011/0029514 A1* | 2/2011 | Kerschberg | G06F 16/3326 707/732 |
| 2012/0308121 A1* | 12/2012 | Datta | G06F 16/24578 382/155 |
| 2013/0191416 A1* | 7/2013 | Lee | G06F 17/30979 707/771 |
| 2015/0161241 A1* | 6/2015 | Haggar | G06F 16/3329 707/723 |
| 2015/0310005 A1* | 10/2015 | Ryger | G06F 17/30011 707/706 |
| 2016/0117485 A1 | 4/2016 | Allen et al. | |
| 2016/0196491 A1 | 7/2016 | Chandrasekaran et al. | |
| 2016/0224532 A1* | 8/2016 | Miller | G06F 16/22 |
| 2016/0299883 A1* | 10/2016 | Zhu | G06F 17/273 |

(Continued)

OTHER PUBLICATIONS

Anonymously; "Method and Apparatus for Trust, Vicinity, Natural Language Processing Based Collaboration Leveraging Insights—Based Cognitive Models"; http://ip.com/IPCOM/000241376D; Apr. 21, 2015, 5 pages.

(Continued)

*Primary Examiner* — Matthew J Ellis
(74) *Attorney, Agent, or Firm* — Reza Sarbakhsh

(57) ABSTRACT

Unstructured data are processed in response to a request for information to derive attributes. The attributes include a subset of variables utilized to determine the requested information. The attributes are ranked based on a set of relevance factors for determining the requested information. One or more attributes are selected for presentation to a user based on the ranking to receive modifications and produce modified attributes. The requested information is determined based on the set of variables including the modified attributes.

18 Claims, 5 Drawing Sheets

(56) References Cited

U.S. PATENT DOCUMENTS

2018/0081989 A1* 3/2018 Nakao .............. G06F 17/30867
2018/0113867 A1 4/2018 Erpenbach et al.

OTHER PUBLICATIONS

Anonymously; "Cognitive Computing Based Smart Design Option Tool"; http://ip.com/IPCOM/000243454D; Sep. 22, 2015, 4 pages.
Chao, T. et al.; "Query Services Ranking for Recommendation Based on Review Analysis"; Journal of Chinese Computer Systems, vol. 32, No. 9, Sep. 2011, pp. 1740-1746.
"Metadata attributes", http://www.bscw.de/files/help-4.4/english/index.html?turl=WordDocuments%2Fmetadataattributes.htm, retrieved from internet Jul. 2016, 1 page.
Kaur, "Review On Error Detection and Error Correction Techniques in NLP", International Journal of Advanced Research in Computer Science and Software Engineering, vol. 4, Issue 6, Jun. 2014, pp. 851-853.
"Defining Attributes in Metadata Classes", https://msdn.microsoft.com/en-us/library/ff664465(v=pandp.50).aspx, retrieved from internet Jul. 2016, 1 page.

* cited by examiner

NATURAL LANGUAGE PROCESSING REVIEW AND OVERRIDE BASED ON COGNITIVE SYSTEM ANALYSIS

BACKGROUND

1. Technical Field

Present invention embodiments relate to computational linguistics, and more specifically, to prioritizing items for human review in a natural language processing environment using machine-implemented cognitive processing.

2. Discussion of the Related Art

Natural language processing (NLP) is an active field of research and development in computer science and engineering. NLP applies a combination of techniques implemented on a computing platform, i.e., processing hardware and software executing thereon, to extract and analyze concepts from, among other things, unstructured text documents. A key objective of NLP is to produce information that is meaningful to a human user from the unstructured text. Current NLP methods do this very well, albeit with some shortcomings in accuracy. However, even with less than ideal accuracy, modern NLP systems can provide suitable results.

NLP accuracy is highly dependent on whether the processor has sufficient information to choose the correct answer from different candidates, each being formed using different interpretations of the data and of the question. It is not uncommon for a single NLP error on a key piece of information to cause unreliable conclusions. Typical NLP systems provide tools with which a user can examine NLP-based conclusions and correct erroneous and/or missing items. Current NLP correction tools usually present the user with suspect items in various forms of a list. Such mechanisms entail the user to walk through the list to verify and/or correct the suspect items, all the while being unaware that obtaining the answer to its question may be achieved by correcting only a few key items. Since the key items may be buried anywhere in the list, the user is forced to verify and/or correct all of the items in the list to ensure that those key items are correct. This can take considerable time—so much so that some users will give up in frustration. Indeed, for complex systems involving a vast number of information items, such as in a healthcare system that diagnoses symptoms and suggests treatments, the NLP review process may require reviewing numerous display screens of data. Indeed, reviewing and correcting just one patient's full medical history can drive a user to such frustration that they decide to forego the NLP correction process altogether. The unfortunate consequence of this is that very few corrections are made to NLP-generated information and confidence in the decisions made by the system suffers.

SUMMARY

According to one embodiment of the present invention, unstructured data are processed in response to a request for information to derive attributes. The attributes include a subset of variables utilized to determine the requested information. The attributes are ranked based on a set of relevance factors for determining the requested information. One or more attributes are selected for presentation to a user based on the ranking to receive modifications and produce modified attributes. The requested information is determined based on the set of variables including the modified attributes.

BRIEF DESCRIPTION OF THE DRAWINGS

Generally, like reference numerals in the various figures are utilized to designate like components.

DETAILED DESCRIPTION

Embodiments of the invention provide techniques by which a user is made aware of the key NLP-generated concepts that are suspect. Such mechanisms prioritize what information items a user should examine for a single scenario while, at the same time, items that are unimportant or irrelevant to the particular scenario are excluded from the review process and may be omitted from the review user interface (UI). User preferences as to what NLP-generated concepts are to be presented for review can be applied in embodiments of the invention as well. By reducing the amount of NLP-generated information that a user is asked to correct, the user is more likely to provide the key corrections to important items, and higher confidence in decisions made by the system can be realized.

The present invention is an improvement in natural language processing, which, by definition, is a "computer-related technology." The improvements described herein allow computer performance of natural language functionality not previously performed by computer-implemented natural language processing systems.

For purposes of explanation and not limitation, the domain logic exemplified herein pertains to healthcare; although it is to be understood that the present invention is not so limited. That is, embodiments of the invention may be used in organizational domains other than healthcare without departing from the spirit and intended scope thereof.

Figure 1:
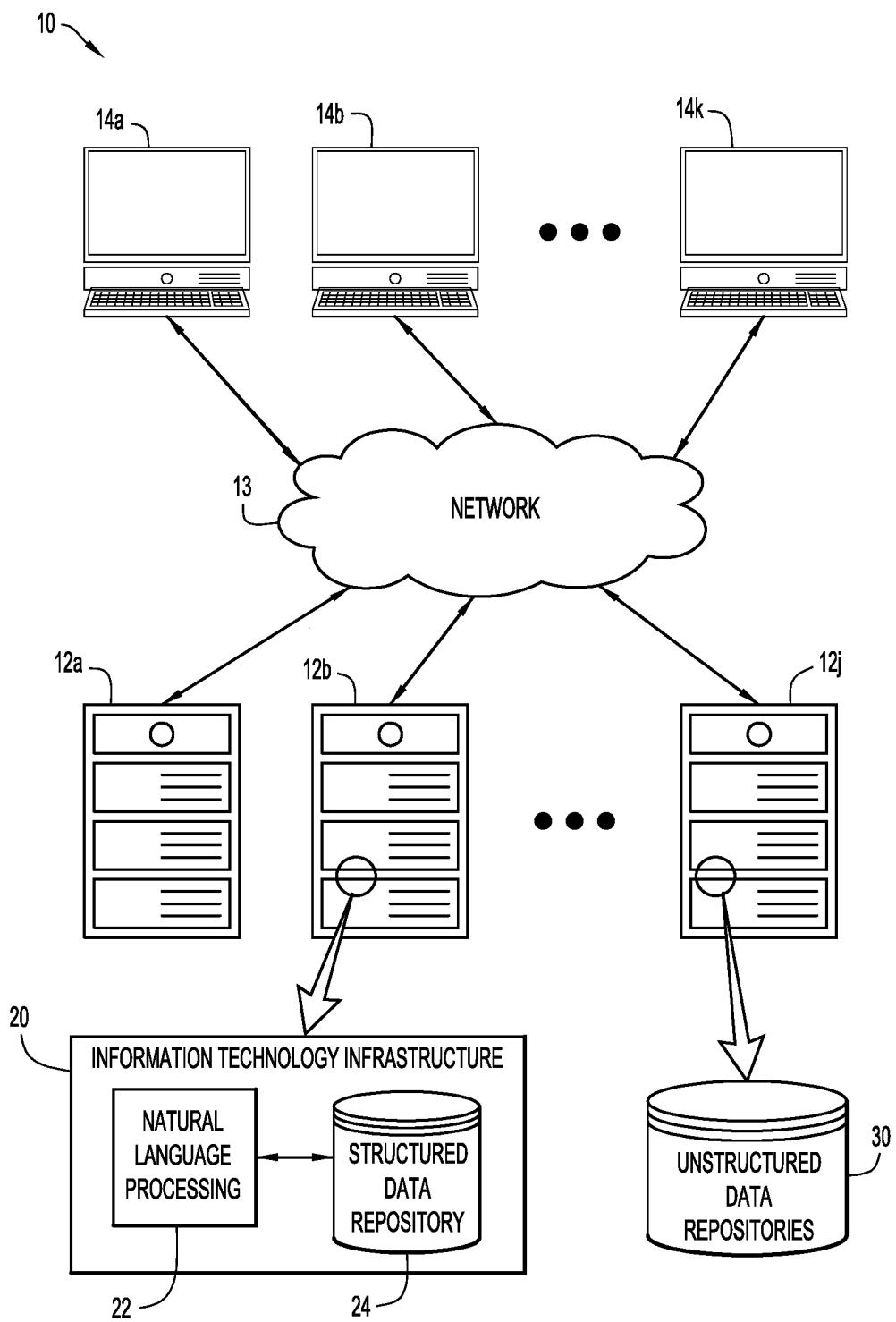
FIG. 1 illustrates an example environment in which the present invention can be embodied.

An example environment for use with present invention embodiments is illustrated in FIG. 1 as network infrastructure 10. As is illustrated, the environment includes one or more server systems 12a-12j, representatively referred to herein as server system(s) 12, and one or more client or end-user systems 14a-14k, representatively referred to herein as client system(s) 14. Server systems 12 and client systems 14 may be remote from each other and may communicate over a network 13. Network 13 may be implemented through any number of suitable communications media, e.g., metallic conductors, optical fiber, air, etc. using one or more signaling techniques and possibly in accordance with one or more standardized communication protocols, e.g., Internet Protocol (IP), Transport Control Protocol (TCP), User Datagram Protocol (UDP), etc. Network 13 may be supported by suitable hardware components to implement wide area networks (WAN), local area networks (LAN), internets, intranets, etc. Alternatively, server systems 12 and client systems 14 may be sufficiently local to each other to communicate through direct or line-of-sight techniques, e.g., wireless radio links, fiber-less optical links, etc. In certain implementations, services and functionality of server systems 12 and those of client systems 14 may be performed by common circuitry and shared computational resources in a single device, such as a workstation.

Server systems 12 and client systems 14 may be implemented by any conventional or other computer system preferably equipped with a display or monitor, a base (e.g., including at least one processor (not illustrated), one or more memories (not illustrated) and/or internal or external network interfaces or communications devices, e.g., modem, network cards, etc. (not illustrated), optional input devices, e.g., a keyboard, mouse or other input device (not illustrated), and any commercially available, open-source and custom software, e.g., operating system, server/communications software, browser/interface software, etc.

One or more client systems 14 and/or one or more server systems 12 may be constructed or otherwise configured to implement an information technology infrastructure (ITI) 20. ITI 20 represents a unified framework by which enterprise data are collected, stored, retrieved and managed. To that end, ITI 20 may implement a structured data repository (SDR) 24, in which structured information is stored. The present invention is not limited to specific implementations of SDR 24; upon review of this disclosure, those having skill in information technology will recognize numerous structured information storage techniques that can be used in conjunction with the present invention without departing from the spirit and intended scope thereof.

ITI 20 may implement a natural language processing (NLP) component 22 that, among other things, identifies entities or objects in unstructured text of a document, determines relationships between those entities, produces structured information data from the unstructured input text based on the determined relationships between entities and stores that information data in SDR 24. NLP component 22 may also implement cognitive computing functionality including, among other things, machine learning, automated reasoning, human-computer interaction and question/answer processing.

Unstructured data repositories 30 represent various sources from which unstructured information may be obtained. As used herein, "unstructured data," including the more specific "unstructured text," refers to data that are in some form humanly-perceivable as specific information (printed text, images, audio, etc.), but not in a form by which a computer could identify that information (metadata, digital representations of the printed text, images, audio, etc.). Unstructured data repositories 30 be implemented on one or more client systems 14 and/or on one or more server systems 12 connected to network 13. Accordingly, data repositories 30 may be a part of ITI 20 or may be external to ITI 20, such as would be found as a collection of web pages on the World Wide Web. The present invention is not limited to particular data or storage configurations for data repositories 30.

NLP component 22 may collect and process unstructured input text in accordance with an established information model so that the processed data may be integrated into the information scheme of ITI 20. An "information model," as used herein, represents the linguistic concepts for each domain of discourse realized in ITI 20, as well as the relationships between those concepts, constraints, rules, and operations by which textual content is construed to derive its underlying semantics. An information model may encompass multiple ontologies, where an "ontology," as used herein, is a specification of linguistic entities by which meaning is conveyed between agents in a domain of discourse. An ontology includes, without being limited to, the lexicography, morphologies, grammatical and syntactical rules, special patterns of text, etc., for the domain of discourse. Ontologies may include local and/or general ontologies, which may specify general language and enterprise-internal linguistic entities, and domain-specific ontologies, which specify linguistic entities of highly-specialized domains of discourse, e.g., those having idiosyncratic vocabularies and/or morphologies, such as in the fields of healthcare, law, finance, scientific research, etc. The present invention is not limited to a specific technique in which ontologies are realized in an information technology infrastructure 20. Upon review of this disclosure, those having skill in computational linguistics will recognize different techniques by which ontologies may be realized in particular information integration applications without departing from the spirit and intended scope of the present invention.

Figure 2:
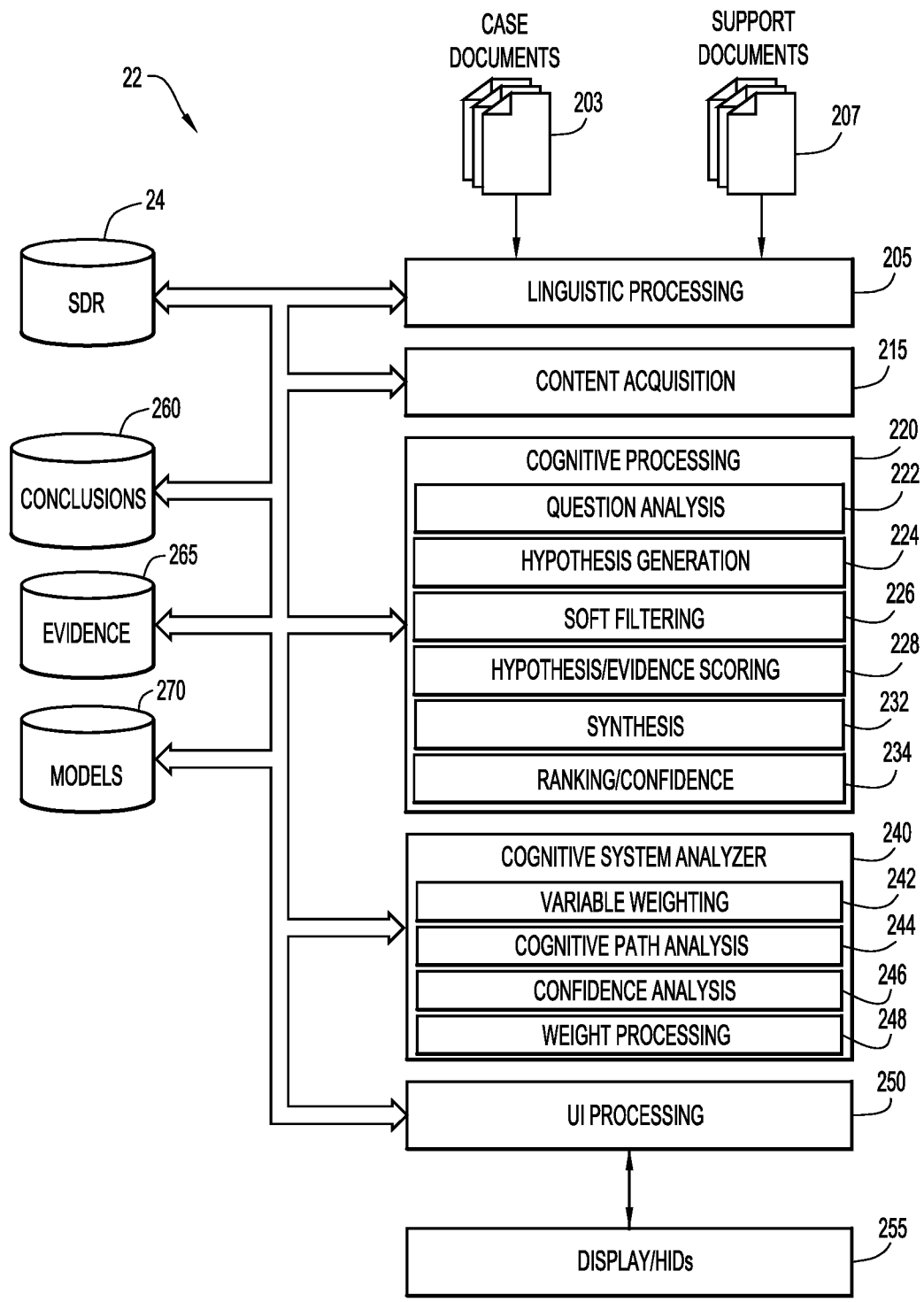
FIG. 2 is a schematic block diagram of an example NLP processor by which the present invention can be embodied.

FIG. 2 is a schematic block diagram of an example NLP component 22 by which the present invention can be embodied. NLP component 22 may be constructed or otherwise configured to generate and score conclusions (answers) to user-selected lines of inquiry (questions) using natural language processing, cognitive processing, machine learning and machine reasoning techniques. The combination of techniques described herein gathers and weighs evidence assembled from unstructured and structured information sources and uses that evidence to express a certain level of confidence, as indicated by a computed confidence score, that a given conclusion is correct. To ensure that conclusions are based on sufficient information, embodiments of the present invention identify inconsistent and/or missing information and ranks such information according to what is most important and/or most relevant to the specific line of inquiry. In so doing, human users can provide the most important missing/erroneous information and leave resolution of whatever other missing information items there are for later sessions and/or for other human reviewers.

As part of ongoing background operations, support documents 207 may be provided to a linguistic processing component 205. Linguistic processing component 205 may be constructed or otherwise configured to perform various machine-executable operations for extracting information from unstructured text in documents, e.g., support documents 207, and for producing structured information from the document contents. Linguistic processing component 205 may perform standard extraction mechanisms, such as optical character recognition, metadata tagging, etc., and such natural language processing operations as lexical analysis, syntactic analysis, semantic analysis, information extract-transform-load processing, etc. Such processing is typically guided by a schema that defines the data types and data structures of which the structured data are comprised. Those having skill in the art will recognize and understand various linguistic processing techniques and principles that can be used in conjunction with the present invention without explicit explanation being set forth herein. Structured information produced by linguistic component 205 may be stored in suitable data structures, referred to herein as "information objects," of SDR 24 using conventional and/or proprietary techniques and according to data integration models established by the business logic, e.g., healthcare. As used herein, information objects are considered "structured data" and contain computer-readable data that identifies humanly-perceivable information.

Support documents 207 may comprise generic information common to multiple domains of discourse, e.g., encyclopedias, dictionaries, thesauri, newswire articles, literary works, general scholastic texts, web pages, etc., as well as information that is particular to the domains of discourse used by a specific community or enterprise. For example, in the field of healthcare, support documents 207 may include medical scholastic texts, medical journal articles, diagnostic manuals, pharmacopoeia, etc. The information extracted from support documents 207 may be stored in the information objects of SDR 24.

Content acquisition component 215 may be constructed or otherwise configured to analyze various sample questions that would occur in a particular problem space (e.g., healthcare) to produce information that describes the kinds of questions that arise in that problem space. Cognitive acquisition component 215 may also produce information characterizing the domains of discourse used in the problem space. Analyzing sample questions typically requires user involvement, i.e., manual review and correction, while domain analysis may be performed automatically by statistical analyses and other techniques.

The information produced by content acquisition component 215 may comprise conclusions 260 that include the answers to the sample questions and evidence 265 that includes context clues used in arriving at hypotheses. This information is described in further detail below. In certain embodiments, conclusions 260 and/or evidence 265 may be stored in common information objects of SDR 24. That is, the information objects produced by the components and processes of NPL component 22 may include both conclusions 260 and evidence 265, as well as other information described herein. When so embodied, information objects 260 may contain all of the information needed for review operations in a dynamically configured user interface. This feature is described in detail below.

Once sufficient content has been collected and analyzed for producing conclusions 260 and evidence 265, a set of case documents 203 may be provided to linguistic processing component 205. Case documents 203 may be a set of documents containing unstructured information, e.g., medical files for a particular patient, related to a particular line of inquiry, e.g., diagnoses and treatment options for the particular patient given the information in the patient's medical files. In a healthcare scenario, case documents 205 may include results from diagnostic testing, previous and ongoing medication regimens, physician notes, etc. for the particular patient. Information objects containing the structured information produced from case documents 203 may be provided to a cognitive processing component 220. Cognitive processing component 220 may analyze the information extracted from case documents 203 and recommend diagnoses and treatment (answers) based on the particulars of the case (questions) using knowledge in the relevant fields of medicine extracted by content acquisition component 215.

As illustrated in FIG. 2, cognitive processing component 220 may include a question analysis component 222 that determines the nature of the question being asked and that performs initial analyses for downstream processing. To do so, question analysis component 222 may implement a wide array of well understood techniques, such as shallow parses, deep parses, logical forms, semantic role labels, co-reference, relations, named entities, etc., as well as specific kinds of analysis for answering questions. These operations produce the data on which other processing operations are brought to bear.

Question analysis component 222 may employ question classification that identifies question types or parts of questions that require special processing. This can include anything from single words with potentially double meanings to entire clauses that have certain syntactic, semantic, or rhetorical characteristics that are handled by downstream components of NLP component 22. Question classes may include puzzle questions, math questions, definition questions, and so on. In the field of healthcare, question classes may include diagnosis questions, treatment questions, disease progression questions, etc.

Question analysis component 22 may identify a word or noun phrase in the question that specifies the information type (e.g., treatment answer, diagnosis answer, etc.) of the question's answer, referred to herein as a lexical answer type (LAT). Candidate answers can be scored by a confidence metric as to whether a candidate answer considered an instance of the LAT and making such determination is a common source of critical errors.

Question analysis component 22 may also identify a "focus" of the question, i.e., the part of the question that, if replaced by the answer, makes the question a stand-alone statement. For example, the focus of "the patient should do X to avoid side effects . . . " is "do X." The focus often (but not always) contains useful information about the answer and is used in embodiments of the invention for gathering evidence about a candidate answer.

Most questions contain relations, whether they are syntactic subject-verb-object predicates or semantic relationships between entities. Cognitive processing component 220 may use relation detection throughout its processes, from focus and LAT determination, to passage and answer scoring. Detected relations may also be used to query a triple-store (containing subject-predicate-object information objects) from which candidate answers can be directly retrieved.

Certain questions are better answered through decomposition. Question analysis component 222 may use rule-based deep parsing and statistical classification methods to both recognize whether questions should be decomposed and to determine how best to break them up into sub-questions. It is generally accepted by skilled artisans that the correct question interpretation and derived answer(s) will score higher after all the collected evidence has been considered and all the relevant algorithms applied. Even if the question did not need to be decomposed to determine an answer, question decomposition may improve the confidence in the overall question in some cases.

As illustrated in FIG. 2, cognitive processing component 220 may include a hypothesis generation component 224, by which the results generated by question analysis component 222 are used to produce candidate answers. To do so, hypothesis generation component 224 may search various information sources and extract answer-sized snippets from the search results. Each candidate answer plugged back into the question is considered a hypothesis, which NLP component 22 assesses as an answer to the question.

Hypothesis generation component 224 may conduct a search over many content sources to find as much potentially answer-bearing content as possible based on the results of question analysis. Hypothesis generation component 224 may realize a variety of search techniques, including the use of multiple text search engines with different underlying approaches, document search as well as passage search, knowledge base search, the generation of multiple search queries for a single question and others. At this hypothesis generation phase, recall (the fraction of relevant instances that are retrieved) is significantly favored over precision (the fraction of retrieved instances that are relevant) with the expectation that subsequent processing will arrive at the correct answer, even if the set of candidates is quite large. NLP component 22 thus tolerates non-relevant answer noise in the early processing stages and drives up precision downstream.

The kind of search performed by hypothesis generation component 224, e.g., document search, knowledge base search, etc., is associated with a corresponding technique for generating candidate answers. For example, for document search results from "title-oriented" resources, the title may be extracted as a candidate answer. Hypothesis generation component 224 may generate a number of candidate answer variants from the same title based on substring analysis or link analysis (if the underlying source contains hyperlinks). Passage search results require more detailed analysis of the passage text to identify candidate answers. As one example of such analysis, named entity detection may be used to extract candidate answers from the passage. Some sources, such as a triplestore and reverse dictionary lookup tables, produce candidate answers directly as their search result. Embodiments of the invention generate several hundred candidate answers at this stage.

Cognitive processing component 220 may include a soft filtering component 226 that applies lightweight (less resource intensive) scoring techniques to a larger set of initial candidates to prune them down to a smaller set of candidates before the more intensive scoring is undertaken. For example, a lightweight scorer may compute the likelihood of a candidate answer being an instance of the LAT, as discussed above. Soft filtering component 226 combines the lightweight analysis scores into a soft filtering score. For example, candidate answers that meet a soft filtering criterion, e.g., a predetermined threshold, proceed to hypothesis and evidence scoring component 228, while those candidates that do not meet the filtering criterion are routed directly to synthesis component 232. Embodiments of the invention determine a soft filtering scoring model and filtering criterion by, for example, machine learning over suitable training data. Certain embodiments allow roughly 100 candidates pass the soft filter, but this may be a user-selectable parameter.

In hypothesis/evidence scoring component 228, candidate answers that meet the soft filtering criterion undergo a rigorous evaluation process that involves gathering additional supporting evidence for each candidate answer, or hypothesis, and applying a wide variety of deep scoring analytics to evaluate the supporting evidence. Evidence is information by which a candidate answer is supported or refuted. For example, if a candidate answer is similar in structure, context and semantics as other usage examples gathered as evidence, there is a greater confidence in the answer being correct. If there are no (or few) usage examples that match the candidate answer, the confidence in the candidate would be lower.

Embodiments of the invention may implement a variety of evidence-gathering techniques. An example technique performs a passage search in hypothesis generation component 224 in which the candidate answer is added as a required term in the search query derived from the question. This will retrieve passages that contain the candidate answer in the context of the original question terms. Supporting evidence may also come from other sources like triplestores. The retrieved supporting evidence may be subjected to deep (precisely targeted) evidence scoring operations, which evaluate the candidate answer in the context of the supporting evidence.

Hypothesis/evidence scoring component 228 performs the bulk of the deep (precisely targeted) content analysis. Its scoring algorithms determine the degree of certainty that retrieved evidence supports the candidate answers. NLP component 22 may support many different scoring techniques that consider different dimensions of the evidence and produce a score that corresponds to how well evidence supports a candidate answer for a given question. Such scoring techniques may range from formal probabilities to counts to categorical features, based on evidence from different types of sources including unstructured text, semi-structured text, and triplestores. The scoring techniques may consider things like the degree of match between a passage's predicate-argument structure and the question, passage source reliability, geospatial location, temporal relationships, taxonomic classification, the lexical and semantic relations the candidate is known to participate in, the candidate's correlation with question terms, its popularity (or obscurity), its aliases, and so on.

Consider the question, "who was presidentially pardoned on Sep. 8, 1974," which is correctly answered, "Nixon," which is one of the generated candidate answers. One of the retrieved passages used as evidence may be "Ford pardoned Nixon on Sep. 8, 1974." An example passage scorer may count the number of inverse document frequency (IDF)-weighted terms in common between the question and the passage. Another passage scorer may measure the lengths of the longest similar subsequences between the question and passage. A third type of passage scoring measures the alignment of the logical forms of the question and passage. A logical form is a graphical abstraction of text in which nodes are terms in the text and edges represent either grammatical relationships, deep semantic relationships, or both. In the example above, the logical form alignment identifies Nixon as the object of the pardoning in the passage, and that the question is asking for the object of a pardoning. Logical form alignment gives "Nixon" a good score given this evidence. In contrast, a candidate answer like "Ford" would receive near identical scores to "Nixon" for term matching and passage alignment with this passage, but would receive a lower logical form alignment score.

Other types of scorers use knowledge in triplestores, simple reasoning such as subsumption and disjointness in type taxonomies, and geospatial and temporal reasoning. Geospatial reasoning may be used to detect the presence or absence of spatial relations such as directionality, borders, and containment between geoentities. For example, if a question asks for an Asian city, then spatial containment provides evidence that Beijing is a suitable candidate, whereas Sydney is not. Similarly, geocoordinate information associated with entities may be used to compute relative directionality (for example, California is SW of Montana; GW Bridge is N of Lincoln Tunnel, and so on).

Temporal reasoning may be used to detect inconsistencies between dates in the evidence and those associated with a candidate answer. For example, the two most likely candidate answers generated for the question, "who took a job as a tax collector in Andalusia in 1594," are "Thoreau" and "Cervantes." In this case, temporal reasoning is used to rule out Thoreau as he was not alive in 1594, having been born in 1817, whereas Cervantes, the correct answer, was born in 1547 and died in 1616.

Cognitive processing component 220 may include a synthesis component 232, by which the hundreds of hypotheses are evaluated based on potentially hundreds of thousands of scores to identify the single best-supported hypothesis given the evidence and to estimate its confidence, i.e., the likelihood that it is correct. Since multiple candidate answers for a question may be equivalent despite very different surface forms, answer merging may be applied by synthesis component 232 to avoid conflicts in ranking techniques that utilize relative differences between candidates. Without such answer merging, ranking algorithms might compare multiple surface forms that represent the same answer in an attempt to discriminate among them. However, different surface forms are often disparately supported in the evidence and result in radically different, though potentially complementary, scores. Embodiments of the invention apply an ensemble of matching, normalization, and co-reference resolution algorithms, by which equivalent and related hypotheses (for example, Abraham Lincoln and Honest Abe) are identified.

As illustrated in FIG. 2, cognitive processing component 220 includes a ranking/confidence component 234 to rank the hypotheses and estimate confidence based on their merged scores. Embodiments of the invention implement machine-learning techniques that operate over a set of training questions with known answers to train a model 270 based on the scores. Certain embodiments realize a very flat model that applies existing ranking algorithms directly on the merged scores and use the ranking score for confidence. Other embodiments implement more intelligent ranking in which ranking and confidence estimation is separated into two phases. In both phases, sets of scores may be grouped according to their domain (for example type matching, passage scoring, and so on.) and intermediate models trained using ground truths and methods specific for that task. Using these intermediate models, the system produces an ensemble of intermediate scores. Embodiments of the invention may build and train multiple models 270 by well-known and/or proprietary machine learning techniques to handle different question classes as certain scores that may be crucial to identifying the correct answer for a healthcare question, for example, may not be as useful on puzzle questions.

Example cognitive processing component 220 produces information objects containing conclusions (answers) to lines of inquiry (questions) and a confidence score for each conclusion. During the cognitive processing, no sub-component of cognitive processing component 220 commits to an answer; all components produce features and associated confidences, scoring different question and content interpretations. The confidence-processing in embodiments of the invention learns how to stack and combine the confidence scores, such as by machine-learning techniques.

Figure 3:
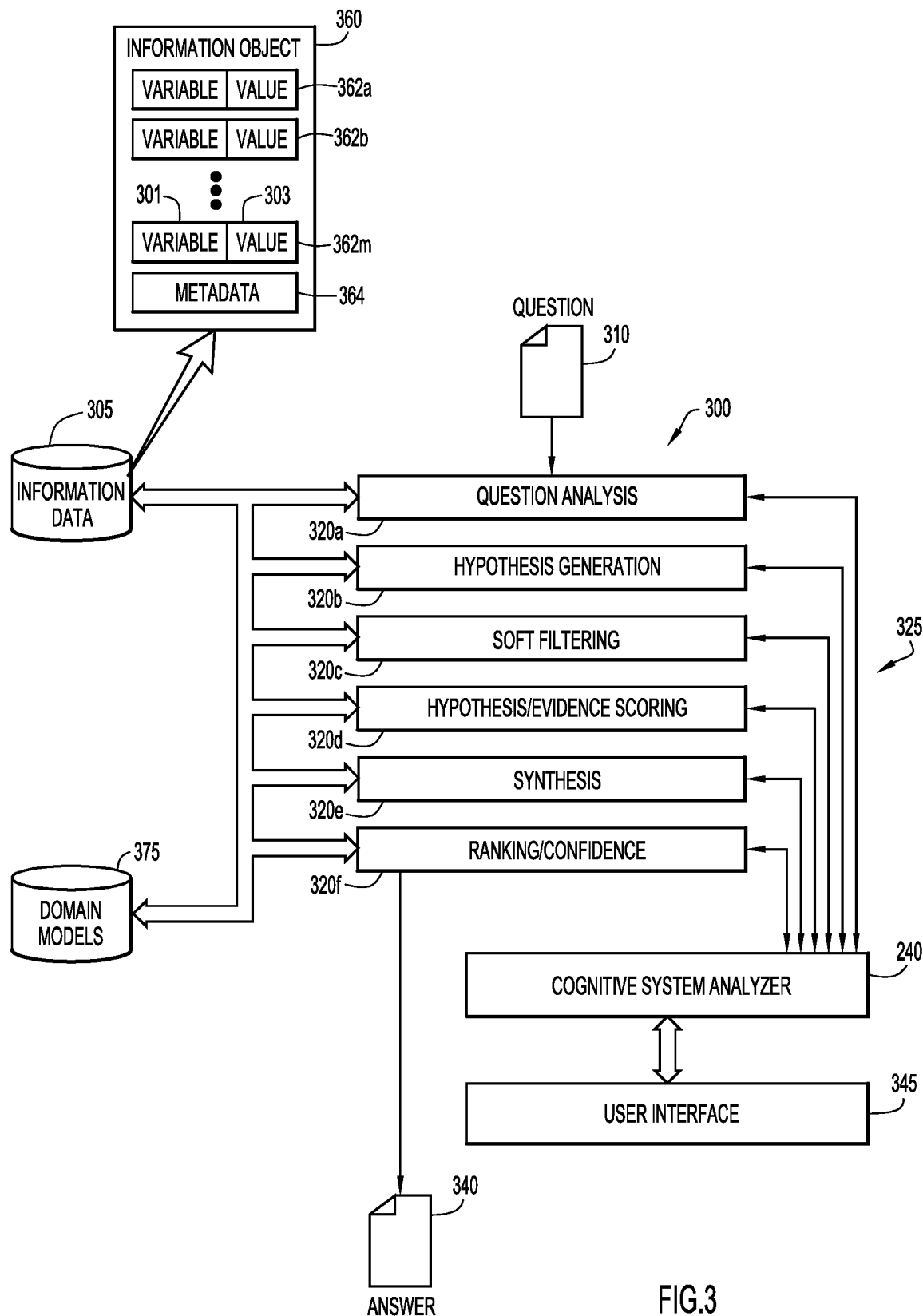
FIG. 3 is a conceptual block diagram of a cognitive pipeline by which the present invention can be embodied.

Those skilled in enterprise information technology will recognize and appreciate that there is typically overarching domain or business logic associated with the natural language and cognitive processing described above. Such domain logic embodies the business rules and/or constraints that specify how data are created, displayed, stored and changed. FIG. 3 is a conceptual block diagram of a cognitive pipeline 300 by which such domain logic can be realized in embodiments of the invention. Cognitive pipeline 300 may comprise the sub-components of cognitive processing component 220, which will be alternatively referred to herein as cognitive pipeline stages 320a-320f or, representatively, as cognitive pipeline stage(s) 320.

As illustrated in the figure, a question 310 may be introduced into cognitive pipeline 300 for which an answer 340 is sought. Question 310 may be a dynamic user-constructed database query and/or may be previously established line(s) of inquiry designed to generate standard and/or usual output products (answers). For example, in healthcare, such output products may be medical diagnoses given patient-specific data, treatment plans for treating specific ailments or diseases given the patient-specific data and the medical diagnoses, etc. In certain embodiments, the desired output products (diagnosis, treatment plan, etc.) may be selected by a user through a user interface, such as user interface 345. Question 310 may be processed by cognitive pipeline 300, as described above with reference to cognitive processing component 220.

Information data 305 represents all the data that has been previously processed by, for example, ETL operations on background data, previously-generated conclusions or recommendations, evidence gathering, etc. Information data 305 may be a collection of information objects 360 stored in SDR 24. As illustrated in FIG. 3, information object 360 includes one or more attributes 362a-362m, representatively referred to herein as attributes(s) 362, and metadata 364 that is inserted into information object 360 as it is transformed and/or modified by the operations of cognitive pipeline 300. Attributes may include variables 301 and values 303 assigned to the variables 301. Metadata 364 may include information described above with reference to FIG. 2, as well as information about the operations performed by the particular cognitive processing stage 320. Attributes 362 and metadata 364 may be added and or modified, such as by assigning values 303 to variables 301, as information objects 360 traverse cognitive pipeline 300, i.e., from one cognitive processing stage to another. It is to be understood while a single information object 360 is illustrated in FIG. 3, information data 305 may comprise millions of information objects 360 of varying size and containing various information.

Domain models 375 represent domain-specific knowledge by which a domain-specific question is interpreted and processed to result in a domain-specific answer. Such domain-specific knowledge may include, for example, background data, rules, formulas, transforms, constants, etc. by which each cognitive processing stage 320 produces that stage's output information objects 360 from that stage's input information objects 360. For example, in the healthcare domain, domain models 375 realize methodology by which a certain medical diagnosis is derived from gathered data, e.g., medical history, laboratory results, physicians notes, etc. Each cognitive processing stage 320 may insert new attributes 362 such as in response to computing a mathematical formula, processing text, etc., in accordance with domain model 375, may assign values 303 to variables 301 including numbers, text, images, video, hyperlinks, etc., based on the processing functionality of the cognitive processing stage 320 as defined by domain model 375. Domain models 375 may be a collection stored in models 270.

Each cognitive processing stage 320 further generates metadata 364 that is inserted into a corresponding information object 360. Among other things, metadata 364 specifies what and how attributes 362 are used in each processing stage 320, determines the origin of inserted or modified attributes 362, identifies what new variables 301 are generated and what values 303 are assigned to those variables 301, etc., based on the functionality of the cognitive processing stage 360 as dictated by domain models 375. Metadata 364 may also include confidence and other scores on attributes 362, how important/relevant an attribute 362 is for fulfilling the domain model specifications as they pertain to question 310, and so on. Each processing stage 320 may also identify missing data as well as how important/relevant that missing data is for fulfilling the domain model specifications and indications of such may be stored in metadata 364.

As discussed above, there are instances when conclusions cannot be reached to a desired level of confidence due to missing or erroneous data. Embodiments of the present invention provide techniques by which a user can override the cognitive processing to fill in missing data, correct errors, resolve ambiguities, etc., in a manner by which the most important/relevant suspect information is presented more prominently (or exclusively) over less important/relevant information.

The metadata 364 generated at each cognitive processing stage 320 are carried through remaining cognitive processing stages 320 of cognitive pipeline 300 and are then analyzed by cognitive system analysis component 240. As will be described in more detail below, cognitive system analysis component 240 identifies missing, erroneous and ambiguous attributes based on the metadata 364 generated at each processing stage 320. This feature may be conceptualized as metadata 364 of each cognitive processing stage 320 being provided directly to cognitive system analysis component 240, as illustrated by virtual information paths 325. Cognitive system analysis component 240 determines from various metadata 364 what issues are raised, if any, in the generation of answer 340 by cognitive pipeline 300.

In the example of FIG. 3, a user may review and make corrections to attributes presented on user interface 345, which may be conveyed through cognitive system analyzer component 240 back to the cognitive processing stage 320 at which the attributes are used. Cognitive pipeline 300 uses the modified attributes to recompute answer 340. The user may modify any and all of the attributes identified as being important/relevant to answer 340 and, optionally, may modify and/or review other attributes that are not necessarily important/relevant as the user desires.

Returning now to FIG. 2, cognitive system analysis component 240 may be constructed or otherwise configured to append metadata and priority data to information objects 360 that specify what items are most important to review, correct or confirm. In so doing, NLP component 22 produces high quality answers and affords an improved user experience by reducing the number of items to review and/or by suggesting acceptable or probable replacement information to the user.

It is to be understood that while cognitive system analysis component 240 is illustrated in FIG. 2 as being a separate component in NLP component 22, such is for purposes of explanation and not limitation. Indeed, in certain embodiments, the functionality of the various components of cognitive system analysis component 240, as will be described below, is integrated into and cooperating with other components of NLP component 22.

Certain attributes derived from NLP processing component 22 (e.g., a patient's diagnostic lab results), are very critical to arriving at a correct answer to a question (e.g., the patients diagnoses and treatment options). When a patient's diagnosis is overridden, then the new updated value for, e.g., diagnosis, will be used in all future answers, e.g., treatment.

Cognitive system analysis component 240 may comprise various processing elements for tagging information objects 360 with the applicable metadata. In one embodiment, as illustrated in FIG. 2, cognitive system analysis component 240 includes a variable weighting component 242, a cognitive path analysis component 244, a confidence analysis component 246 and a weight processing component 248. Each of these components analyzes various operations performed in cognitive pipeline 300 against a particular domain model 375 to assess what information is missing or incorrect for purposes of prioritizing most important/relevant information over less important/relevant information. Upon review of this disclosure, those skilled in the relevant arts will recognize other analyses that may be performed by cognitive system analysis component 240 without departing from the spirit and intended scope of the present invention.

Cognitive processing component 220 analyzes data and makes conclusions or recommendations for that data through applicable domain models 375 based on one or more values assigned to respective attributes 362. This is typically a small subset of the full set of items analyzed by NLP processing component 22. Different attributes 362 may have different importance or weight in deriving answer 340 to question 310 than other attributes 362. Some variables are essential, while other variables are not essential in achieving a high quality answer 340, but may nevertheless be used in a particular domain model 375. Variable weighting component 242 may assign a weight to the variables indicating the importance, relevance and/or significance the corresponding variable is in producing a reasonably accurate answer 340.

To illustrate, consider a set of variables, e.g., Histology, Stage, Line of Therapy, Epidermal Growth Factor Receptor (EGFR) Mutation, Recurrence, etc., and assume that these attributes are necessary to evaluate a lung cancer patient. In this case, variable weighting component 242 may apply suitable weights to these attributes indicating that they are important/relevant. For a leukemia patient, which uses a slightly different set of variables, some of which, such as Recurrence, must be known (per the domain model 375), while other variables, such as RET Mutation status, need not be known to any specific accuracy and may even be missing. As explained above, metadata 364 may specify exactly which inputs (attributes 362 in information objects 360) are required to make good recommendations for a particular line of inquiry, and cognitive system analyzing component 240 can prioritize those inputs for review and/or correction. Variable weighting component 242 may assign weights on these attributes 362 indicating how important/relevant particular attributes are in determining answer 340 for a topic of inquiry, e.g., a particular type of cancer. Thereby, variable weighting component 242 can distinguish high priority items, i.e., items that must be known for a certain diagnosis, from low priority items, i.e., items that need not be known for the diagnosis, which can save the user time since the low priority items need not be reviewed to get a high quality therapy recommendation.

Cognitive processing paths through cognitive pipeline 300 may dictate what data is relevant or even critical in obtaining a recommendation for a given scenario. In certain embodiments, a domain model 375 used in cognitive pipeline 300 is developed around a known set of variables (e.g., Histology, Stage, etc.). The importance of each variable in the set can change depending on the question/answer scenario. For the healthcare example, cognitive pipeline 300 can determine that for that one patient, certain pieces of information are of greater importance than other information. For example, if an oncology patient exhibits evidence of metastatic disease, cognitive pipeline 300 may not be sensitive to attributes that are relevant for surgical recommendations, like pulmonary function test (PFT) values. That is, since surgery may not be a treatment option for advanced stage/metastatic cases, PFT values are not relevant to recommendations that would typically be sought for metastatic cancer. Thus, in certain embodiments of the invention, cognitive path analysis component 244 can consider the attributes for a particular case and refine the priority of NLP data correction based on that case. To do so, cognitive path analysis component 244 may assign another weight to the attributes that indicate its importance/relevance in the cognitive processing scenario at hand.

Confidence (or lack of confidence) in an answer can be related to confidence in certain NLP-derived attributes, and the user can be informed of this confidence as they consider the answer 340. Confidence analysis component 246 may evaluate answer 340 to question 310, e.g., treatment options for a lung cancer patient, and indicate a level of confidence in answer 340. For example, when all of the inputs required to produce an answer have been provided to cognitive processing component 220, confidence analysis component 246 may indicate a high level of confidence in answer 340. On the other hand, cognitive processing component 220 may determine that one or more important pieces of data are missing and may thus indicate low confidence in answer 340. Embodiments of the present invention allow cognitive processing component 220 to identify which pieces of data are required to provide an answer, and whether it is confident in those pieces of data. When the user reads the answer, such as on user interface component 345, this confidence information may be presented to the user along with the answer 340. In this way, the user can see the level of confidence in the answer, and what missing pieces of information (if any) would help improve the answer.

Weight processing component 248 identifies important/relevant information as well as routine/unimportant information and applies overall weights to the various NLP-derived items based on information provided by variable weighting component 242, cognitive path analysis component 244 and confidence analysis component 246. Weight processing component 248 may determine an overall weight or rank indicating the importance in presenting that item to the user for review. In certain embodiments, the overall weight is compared against a threshold value to determine which items should be presented to a user for NLP review/correction. In the example provided in Table 1 below, the threshold for the overall weight may have been tuned to be at 70% (as marked in Table 1). As illustrated in the example below, only the overall weight of the Recurrence item meets the threshold condition (greater than 70%) and thus is the only item required to be prominently presented to the user.

TABLE 1

| Oncological Concept | Weight of Importance to Cognitive Processing | Weight of importance based on cognitive processing path for this particular patient | Overall weight |
|---|---|---|---|
| Recurrence | 100% | 100% (could be due to no value being present, or could be due to low confidence on part of NLP processing that value is accurate.) | 100% |
| | | THRESHOLD = 70% | |
| Histology | 100% | 65% | 65% |
| Stage | 100% | 20% | 16% |
| Line of Therapy | 70% | 50% | 3.5% |
| EGFR Mutation | 30% | 50% | 1.5% |
| Surgery History | 100% | 0% | 0% |
| Smoking History | 5% | 0% | 0% |
| . . . Other concepts will also be ranked . . . | . . . | . . . | . . . |

In certain embodiments, high priority attributes may be presented to the user, who might also be given an option to view additional NLP-derived attributes. If it is determined that no high priority NLP-derived attributes need to be presented for correction (that is, the confidence is high in that all of the data necessary to provide a high quality answer has been provided), then the user would not be prompted for any NLP corrections. However, when the option to view additional attributes is implemented, the user would still have a way to review less important NLP data and drill into it. For example, in certain embodiments, attributes may be presented in an ordered list that can be sorted by priority or weight. However, it is to be understood that embodiments of the invention are intended to reduce the burden on the user in correcting NLP data by only forcing the user to review the most important NLP data.

In the example above, a threshold value of 70% is set as the cutoff of high priority NLP items to present for cognitive processing override. The threshold can be selected in different ways, including by performing an initial user study to evaluate what threshold is suitable, by enabling the processing to observe whether users tend to drill down into NLP items that aren't indicated as high priority items (which may indicate that the threshold needs to be lowered) and/or by allowing the user to manually configure the threshold so as to specify how much NLP override information they want to see.

Figure 4:
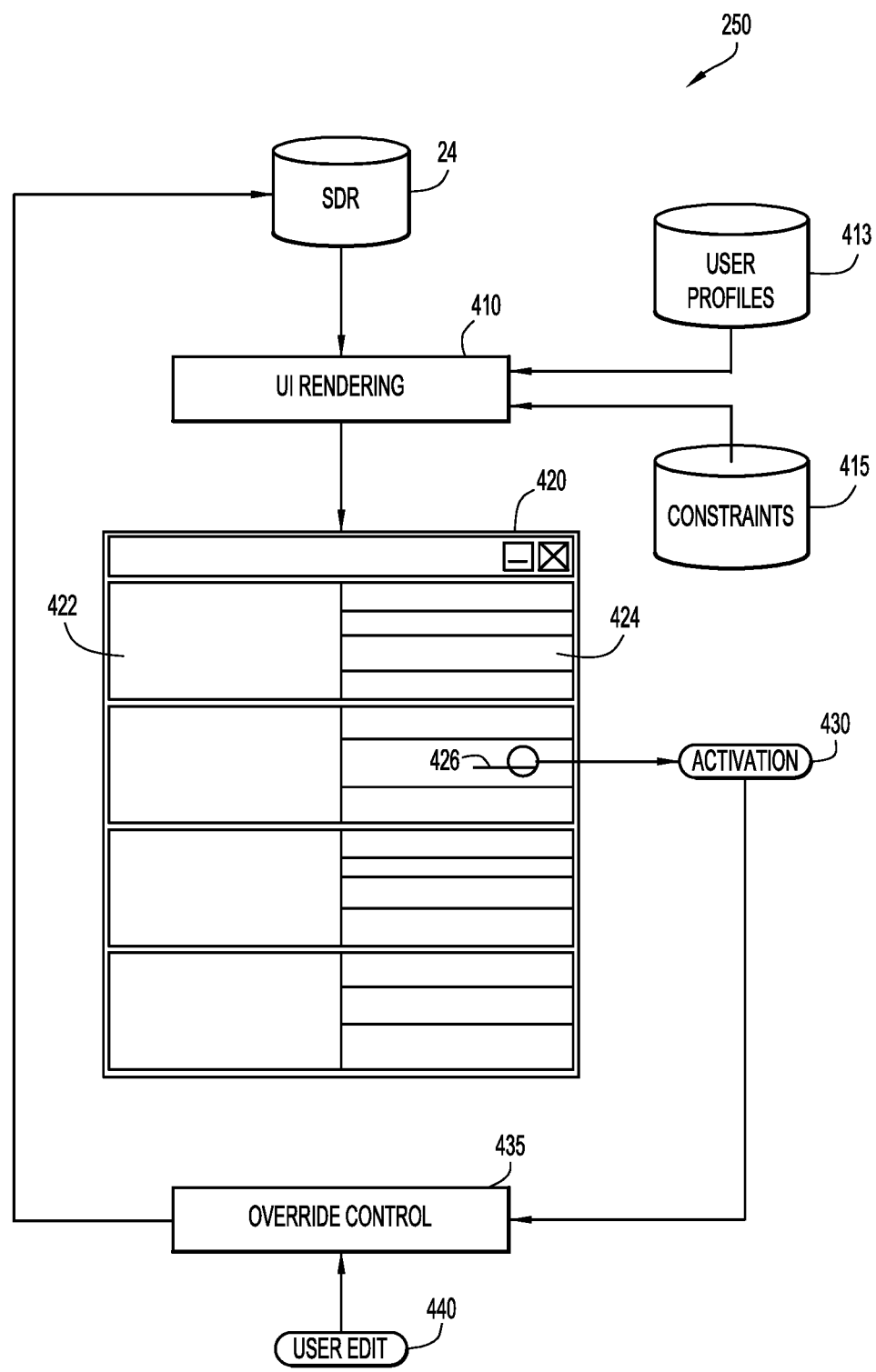
FIG. 4 is a schematic block diagram of an example user interface processing component that may be used in embodiments of the invention.

FIG. 4 is a schematic block diagram of an example UI processing component 250 that may be used in embodiments of the invention. In certain embodiments, UI processing component 250 renders dynamically-configured UI components on a display/human interface devices component 255. In conventional NLP implementations, the UI presentation of derived attributes is static, i.e., fixed by design and hard-coded into the UI rendering mechanisms. In such implementations, UI components that allow users to review derived attributes may be noisy to individual users, i.e., displaying information for review that is relatively irrelevant to or otherwise noninfluential on the conclusions of a particular user's line of inquiry. When relevant derived attributes or problematic NLP-produced items are not prominently displayed and easily accessible for review and edit, the user may become overwhelmed with data and it is less likely that the user will see those attributes that greatly influence the conclusions on which that user relies. Additionally, different users may have different preferences for how much data they want to see in a particular UI environment. Some may want a detailed view to review all available information while others may want to see less data, e.g., the items most critical to an accurate conclusion. Other users may only be interested in particular attributes, e.g., a pathologist who wants to verify that certain concepts related to their own patient's pathology reports were correctly identified. Embodiments of the invention afford such customization.

As illustrated in FIG. 4, UI rendering component 410 may collect information and related metadata from SDR 24 for corresponding information objects 360 that are to be displayed to a user, such as by an interface component 420. UI rendering component 410 may also obtain constraints 415 on the collected information that define how the informational objects are rendered in UI component 420. Constraints 415 may include data type, e.g., integer, floating-point number, character string, etc., and ranges on the data, e.g., integer between 0 and 3, character string of 15 characters, etc. Such information may be determined from stored data structures specifying the schema by which information is characterized by NLP as well as from analysis on values assigned to informational attributes as natural language processing is performed, e.g., tracking per-attribute values during extract-transform-load (ETL) operations. Other constraints may be established through explicit formatting rules, such as to ensure that information is displayed neatly and within size limits of UI component 420. More complex constraints and even relationships among attributes could be specified, such as "Therapy end date must be later than Therapy start date." This encapsulation may also include references to representational state transfer (REST) application programming interfaces (APIs), such as "Use REST API xyz to get a list of possible values for this attribute." Those having skill in the relevant arts will recognize other constraints that can be implemented in conjunction with embodiments of the present invention. Additionally, while constraints 415 is illustrated in FIG. 4 as being contained in a storage component separate from SDR 24, it is to be understood that constraints 415 may be implemented as metadata that is carried in information objects 360 stored in SDR 24.

UI rendering component 410 may additionally access user profiles 413 to obtain user-specified preferences defining what information is rendered in UI component 420. For example, a user profile 413 may specify what derived attributes to render in UI component 420. Another user profile 413 may specify particular lines of inquiry, e.g., diagnoses and treatment options for particular cancers, and UI rendering component 410 may collect the derived attributes relevant to or otherwise associated with those lines of inquiry. Yet another user profile 413 may specify a confidence threshold that a conclusion and/or information used in forming a conclusion must meet; those items for which the threshold confidence is not met may be flagged for review. Embodiments of the present invention may implement fine control over what informational objects may be rendered and ultimately displayed to a user essentially without limit insofar as user preferences can be specified for and applied to machine-implemented UI rendering and display techniques.

UI rendering component 410 may generate UI component 420 to present information objects in accordance with user profiles 413 and constraints 415. UI component 420 may include static information panels, representatively illustrated at static information panel 422, and mutable information panels, representatively illustrated at mutable information panel 424. Static information panels 422 may have rendered therein information objects that are constant, such as patient information, diagnoses and treatment dates, etc. Mutable information panels 424 may have rendered therein information objects that can be modified by a user. For example, such information objects may include derived attribute values that were produced by NLP techniques described herein and that may be overridden by the user. In the embodiment illustrated in FIG. 4, a user may select an information object representation for review, representatively illustrated at information object representation 426, by HID activation 430, such as by mouse click. Information object representation 426 may be logically linked to or otherwise associated with processor-executable instructions that instantiates and renders an override control 435 in response to HID activation 430. Override control 435 may be populated with details of and relevant to the information object underlying information object representation 426 in a manner by which the associated values can be modified. Override control 435 may include various well-known window controls (not illustrated) including edit controls, drop-down list controls, buttons, static labels, etc. In one embodiment, multi-item controls such as drop-down list boxes, may be populated by information contained in constraints 415. For example, in the case of integer-valued items, a drop-down list box may list all integer values for the item specified in constraints 415.

Using such controls in override control 435, a user may edit or otherwise modify one or more values, representatively illustrated at user edit 440, assigned to the associated information object representation 426. The modified value may be stored in the corresponding information object of SDR 24 and new conclusions may be generated, as described with reference to FIG. 2, based on the new values. When information objects are prioritized in UI component 420, as described above, the user may perform NLP overrides without having to search through irrelevant or unimportant information objects for the information that pertains to the user's line of inquiry.

The techniques discussed above also simplify modifications to UI components when the information that is to be displayed changes. That is, adding or removing derived attributes or other information objects is expensive when those attributes are hard-coded in the UI logic, as is the case for conventional override techniques. By way of the techniques described above, the UI logic is relatively independent from the NLP logic; as long as the information is stored in SDR 24 in accordance with the overarching information schema, a UI component 420 can be generated by embodiments of the present invention in accordance with user profiles 413 and constraints 415.

In certain embodiments, NLP component 22 may be based on the Unstructured Information Management Architecture (UIMA) maintained by the Organization for the Advancement of Structured Information Standards (OASIS). UIMA was designed to support interoperability and scaleout of text and multimodal analysis applications. All of the components in cognitive NLP component 22 may be implemented as UIMA annotators, which are processor-executable components that analyze text and produce annotations or assertions about the text. It is to be understood that NLP architectures other than UIMA, including those of proprietary design, may be used in conjunction with the present invention without departing from the spirit and intended scope thereof.

Figure 5:
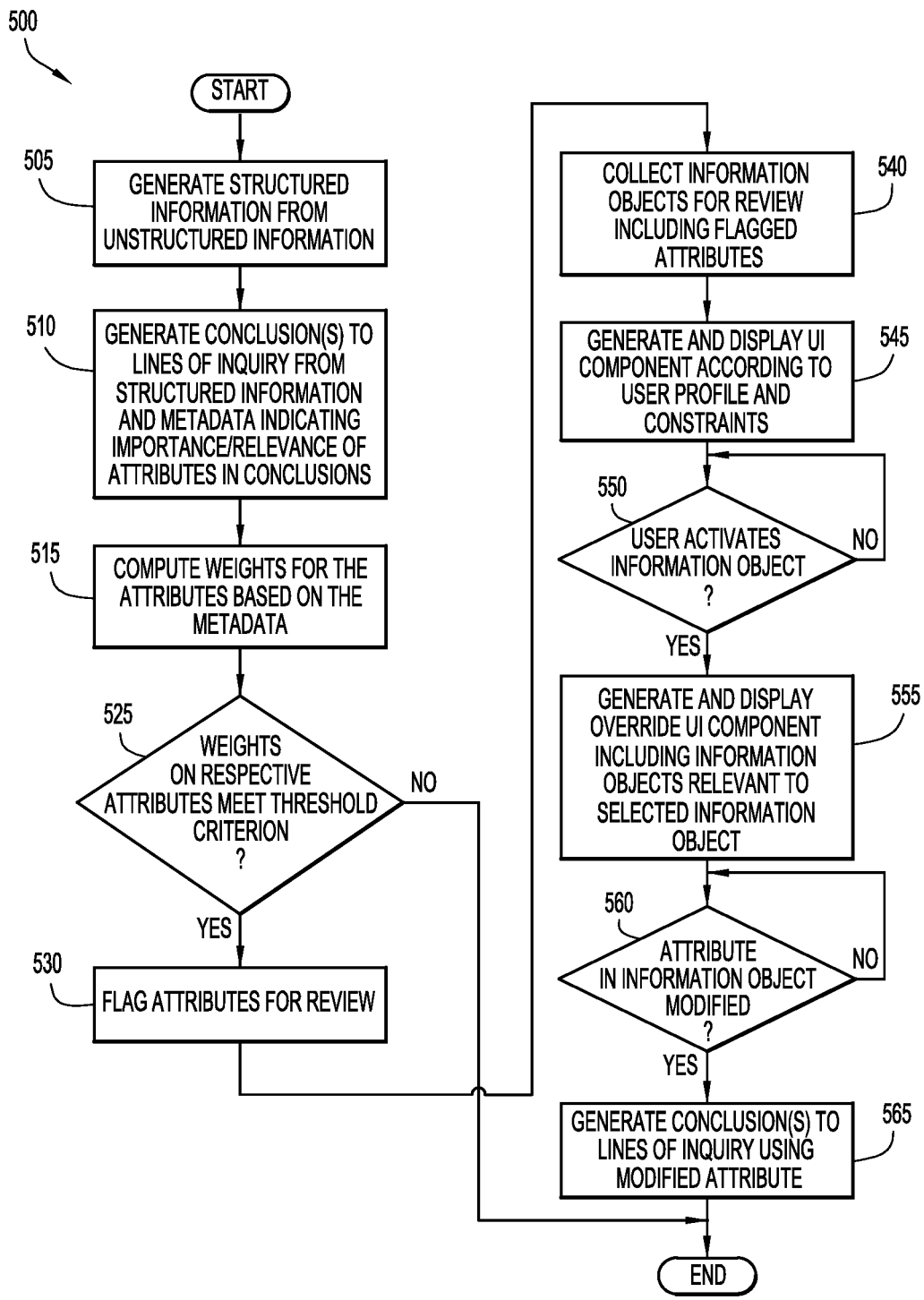
FIG. 5 is a flow diagram of an NLP override process by which the present invention can be embodied.

FIG. 5 is a flow diagram of an NLP override process 500 by which the present invention can be embodied. It is to be understood that the flow diagram in FIG. 5 is constructed to aid in the understanding of the present invention and not for efficient implementation of NLP override process 500. As such, the illustrated flow diagram represents a single pass, single thread implementation whereas a more efficient realization comprises multiple iterations of the illustrated single pass process executing in multiple execution threads. Those having skill in the relevant arts will recognize multiple programming paradigms through which the techniques described herein may be realized for machine execution.

In operation 505 of process 500, NLP operations are performed to generate structured information from unstructured information. Process 500 transitions to operation 510 by which one or more conclusions to respective lines of inquiry are generated from the structured information by cognitive processing. Metadata are also generated during cognitive processing indicating the importance/relevance of the attributes involved in generating the conclusion. In operation 515, weights for the attributes are computed. In operation 525, it is determined whether any of the weights on the attributes meet a predetermined threshold criterion and the weights meeting the threshold criterion are flagged for review in operation 530.

In operation 540, information objects are collected for review including the flagged attribute. The collected information objects may include those involved in forming the conclusion as prioritized by cognitive processing and/or user preferences. In operation 545, a UI component containing the collected and prioritized information objects is rendered or otherwise generated according to the user profile and UI constraints and the rendered UI component is displayed to the user. Process 500 may transition to operation 550, by which it is determined whether the user has activated an information object for purposes of overriding the flagged conclusion. In response to affirming the user activation, process 500 transitions to operation 555, by which an override UI component is generated and displayed to include those information objects relevant to the selected information object for purposes of modifying the information. In operation 560, it is determined whether an attribute contained in an information object is modified through the override UI component and, upon affirming such modification, process 500 transitions to operation 565, by which new conclusions to the user's line(s) of inquiry are generated using the modified information object. Process 500 may then terminate.

Client systems 14 enable users to submit documents (e.g., case documents 203 and supporting documents 207, etc.) to server systems 12. The server systems include an NLP component 22 to process unstructured information into structured information and to generate conclusions based on a user's line of inquiry. A database system, e.g., SDR 24, may store various information for the analysis (e.g., information objects, conclusions, evidence, models, etc.). The database system may be implemented by any conventional or other database or storage unit, may be local to or remote from server systems 12 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to analyses and user lines of inquiry, and may provide reports including analysis results (e.g., text analytics, missing/erroneous information, conclusions, etc.).

One or more client systems 14 may analyze documents to produce NLP-derived conclusions to lines of inquiry when operating as a stand-alone unit. In a stand-alone mode of operation, the client system stores or has access to the data (e.g., information objects, conclusions, evidence, models, etc.), and includes an NLP component to process unstructured information into structured information and to generate conclusions based on a user's line of inquiry. The graphical user (e.g., GUI, etc.) or other interface (e.g., command line prompts, menu screens, etc.) solicits information from a corresponding user pertaining to the desired documents and analysis, and may provide reports including analysis results.

The NLP component may include one or more modules or units to perform the various functions of present invention embodiments described above. The various components (e.g., cognitive processing component, review processing component, etc.) may be implemented by any combination of any quantity of software and/or hardware modules or units, and may reside within memory of the server and/or client systems for execution by a processor.

It will be appreciated that the embodiments described above and illustrated in the drawings represent only a few of the many ways of implementing embodiments for NLP review and override based on cognitive system analysis.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, NLP processing module, etc.). These systems may include any types of monitors and input devices (e.g., keyboard, mouse, voice recognition, etc.) to enter and/or view information.

It is to be understood that the software (e.g., NLP, cognitive processing, review processing) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., NLP, cognitive processing, review processing) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., information objects, conclusions, evidence, models, etc.). The database system may be implemented by any number of any conventional or other databases, data stores or storage structures (e.g., files, databases, data structures, data or other repositories, etc.) to store information (e.g., information objects, conclusions, evidence, models, etc.). The database system may be included within or coupled to the server and/or client systems. The database systems and/or storage structures may be remote from or local to the computer or other processing systems, and may store any desired data (e.g., information objects, conclusions, evidence, models, etc.).

The present invention embodiments may employ any number of any type of user interface (e.g., Graphical User Interface (GUI), command-line, prompt, etc.) for obtaining or providing information (e.g., conclusions, review and override data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria (e.g., constraints, user profiles, etc.) to provide desired information to a user (e.g., text analytics, conclusions, review/correction data, etc.).

The present invention embodiments are not limited to the specific tasks or algorithms described above, but may be utilized for other domains, such as finances, legal analysis, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing a request for information comprising:
   processing unstructured data in a cognitive pipeline including a plurality of stages in response to the request for information, wherein the plurality of stages processes the unstructured data using natural language processing and includes an analysis stage to analyze the request for information, a generation stage to produce candidate responses to the request for information, and a synthesis stage to evaluate the candidate responses;
   passing an information object between each of the plurality of stages of the cognitive pipeline;
   deriving attributes and corresponding metadata at each of the plurality of stages using the natural language processing and inserting the attributes and the corresponding metadata in the information object as the information object traverses each of the plurality of stages, wherein the attributes comprise a subset of variables with values derived from the natural language processing of the plurality of stages that are utilized to determine the requested information, and wherein the corresponding metadata includes a confidence for individual derived attributes with respect to determining the requested information;
   ranking the attributes of the information object based on a set of relevance factors indicating relevance of the attributes for determining the requested information, wherein the set of relevance factors includes a degree an attribute affects the requested information and the confidence for the attribute within the corresponding metadata;
   selecting a subset of the attributes based on the ranking, wherein the attributes of the selected subset have greater relevance for determining the requested information than remaining attributes;
   generating a user interface based on a user profile indicating user preferences for the attributes for presentation of the selected subset of the attributes to a user and for receiving modifications to the selected subset of the attributes to produce modified attributes;
   providing each modified attribute to a corresponding one of the plurality of stages deriving that attribute; and
   determining the requested information via the cognitive pipeline based on the modified attributes.

2. The method of claim 1, wherein the set of relevance factors further includes an importance of the attribute with respect to the request.

3. The method of claim 1, wherein ranking the attributes comprises:
   assigning a weight to each of the relevance factors for an attribute and combining the weights to produce an overall weight for the attribute; and
   ranking the attributes based on corresponding overall weights.

4. The method of claim 3, wherein selecting a subset of the attributes based on the ranking comprises:
   comparing the overall weight of each attribute to a threshold; and
   selecting each attribute satisfying the threshold.

5. The method of claim 4, wherein the threshold is determined based on one or more selected from a group of:
   specified by a user; and history of user viewing of individual ones of the attributes.

6. The method of claim 1, further comprising:
presenting the requested information and corresponding confidence data, wherein the corresponding confidence data indicates a sufficiency of information to determine the requested information and desired information to improve results for the requested information.

7. A system for processing a request for information comprising:
a processor configured to:
process unstructured data in a cognitive pipeline including a plurality of stages in response to the request for information, wherein the plurality of stages processes the unstructured data using natural language processing and includes an analysis stage to analyze the request for information, a generation stage to produce candidate responses to the request for information, and a synthesis stage to evaluate the candidate responses;
pass an information object between each of the plurality of stages of the cognitive pipeline;
derive attributes and corresponding metadata at each of the plurality of stages using the natural language processing and insert the attributes and the corresponding metadata in the information object as the information object traverses each of the plurality of stages, wherein the attributes comprise a subset of variables with values derived from the natural language processing of the plurality of stages that are utilized to determine the requested information, and wherein the corresponding metadata includes a confidence for individual derived attributes with respect to determining the requested information;
rank the attributes of the information object based on a set of relevance factors indicating relevance of the attributes for determining the requested information, wherein the set of relevance factors includes a degree an attribute affects the requested information and the confidence for the attribute within the corresponding metadata;
select a subset of the attributes based on the ranking, wherein the attributes of the selected subset have greater relevance for determining the requested information than remaining attributes;
generate a user interface based on a user profile indicating user preferences for the attributes for presentation of the selected subset of the attributes to a user and for receiving modifications to the selected subset of the attributes to produce modified attributes;
provide each modified attribute to a corresponding one of the plurality of stages deriving that attribute; and
determine the requested information via the cognitive pipeline based on the modified attributes.

8. The system of claim 7, wherein the set of relevance factors further includes an importance of the attribute with respect to the request.

9. The system of claim 7, wherein ranking the attributes comprises:
assigning a weight to each of the relevance factors for an attribute and combining the weights to produce an overall weight for the attribute; and
ranking the attributes based on corresponding overall weights.

10. The system of claim 9, wherein selecting a subset of the attributes based on the ranking comprises:

comparing the overall weight of each attribute to a threshold; and
selecting each attribute satisfying the threshold.

11. The system of claim 10, wherein the threshold is determined based on one or more selected from a group of:
specified by a user; and
history of user viewing of individual ones of the attributes.

12. The system of claim 7, wherein the processor is further configured to:
present the requested information and corresponding confidence data, wherein the corresponding confidence data indicates a sufficiency of information to determine the requested information and desired information to improve results for the requested information.

13. A computer program product for processing a request for information, the computer program product comprising one or more computer readable storage media collectively having program instructions embodied therewith, the program instructions executable by a processor to cause the processor to:
process unstructured data in a cognitive pipeline including a plurality of stages in response to the request for information, wherein the plurality of stages processes the unstructured data using natural language processing and includes an analysis stage to analyze the request for information, a generation stage to produce candidate responses to the request for information, and a synthesis stage to evaluate the candidate responses;
pass an information object between each of the plurality of stages of the cognitive pipeline;
derive attributes and corresponding metadata at each of the plurality of stages using the natural language processing and insert the attributes and the corresponding metadata in the information object as the information object traverses each of the plurality of stages, wherein the attributes comprise a subset of variables with values derived from the natural language processing of the plurality of stages that are utilized to determine the requested information, and wherein the corresponding metadata includes a confidence for individual derived attributes with respect to determining the requested information;
rank the attributes of the information object based on a set of relevance factors indicating relevance of the attributes for determining the requested information, wherein the set of relevance factors includes a degree an attribute affects the requested information and the confidence for the attribute within the corresponding metadata;
select a subset of the attributes based on the ranking, wherein the attributes of the selected subset have greater relevance for determining the requested information than remaining attributes;
generate a user interface based on a user profile indicating user preferences for the attributes for presentation of the selected subset of the attributes to a user and for receiving modifications to the selected subset of the attributes to produce modified attributes;
provide each modified attribute to a corresponding one of the plurality of stages deriving that attribute; and
determine the requested information via the cognitive pipeline based on the modified attributes.

14. The computer program product of claim 13, wherein the set of relevance factors further includes an importance of the attribute with respect to the request.

15. The computer program product of claim 13, wherein the program instructions include further program instructions executable by the processor to cause the processor to:
- assign a weight to each of the relevance factors for an attribute and combine the weights to produce an overall weight for the attribute; and
- rank the attributes based on corresponding overall weights.

16. The computer program product of claim 15, wherein the program instructions include further program instructions executable by the processor to cause the processor to:
- compare the overall weight of each attribute to a threshold; and
- select each attribute satisfying the threshold.

17. The computer program product of claim 16, wherein the program instructions include further program instructions executable by the processor to cause the processor to:
- determine the threshold based on one or more selected from a group of:
  - specified by a user; and
  - history of user viewing of individual ones of the attributes.

18. The computer program product of claim 13, wherein the program instructions include further program instructions executable by the processor to cause the processor to:
- present the requested information and corresponding confidence data, wherein the corresponding confidence data indicates a sufficiency of information to determine the requested information and desired information to improve results for the requested information.

* * * * *